United States Patent
Yamada

(10) Patent No.: US 7,360,903 B2
(45) Date of Patent: Apr. 22, 2008

(54) LIGHT SOURCE DEVICE, METHOD FOR MANUFACTURING LIGHT SOURCE DEVICE, AND PROJECTION TYPE DISPLAY APPARATUS

(75) Inventor: Shuhei Yamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 10/928,145

(22) Filed: Aug. 30, 2004

(65) Prior Publication Data

US 2005/0046801 A1 Mar. 3, 2005

(30) Foreign Application Priority Data

Sep. 1, 2003 (JP) ............... 2003-308969

(51) Int. Cl.
- G03B 21/18 (2006.01)
- G03B 21/20 (2006.01)
- G03B 21/00 (2006.01)
- B60Q 1/06 (2006.01)
- H01S 3/04 (2006.01)

(52) U.S. Cl. .................. 353/54; 353/85; 353/121; 362/373; 372/35

(58) Field of Classification Search .............. 353/30, 353/54, 85, 7, 31, 121, 20; 362/267, 293, 362/294, 373; 372/70, 34, 35

See application file for complete search history.

(56) References Cited

U.S. PATENT DOCUMENTS 4,791,634 A * 12/1988 Miyake ................ 372/34
5,890,794 A * 4/1999 Abtahi et al. ............ 362/294
6,517,221 B1 * 2/2003 Xie ....................... 362/373
6,625,193 B2 * 9/2003 Vetrovec ................. 372/70
6,769,792 B1 * 8/2004 Bornhorst ................ 362/293
6,917,637 B2 * 7/2005 Nagano et al. ............ 372/35
6,991,335 B2 * 1/2006 Kondo et al. ............. 353/54
7,021,767 B2 * 4/2006 Koegler et al. ........... 353/52
7,108,400 B2 * 9/2006 Yamada et al. ........... 362/294
2002/0163625 A1 * 11/2002 Tabuchi et al. ........... 353/31
2003/0007129 A1 * 1/2003 Ashizaki .................. 353/7
2004/0264192 A1 * 12/2004 Nagata et al. ............ 362/267

FOREIGN PATENT DOCUMENTS

| JP | 114480 A | 5/1993 |
| JP | A 6-97335 | 4/1994 |
| JP | A 7-273462 | 10/1995 |
| JP | 08-037389 A | 2/1996 |
| JP | 08-288681 A | 11/1996 |
| JP | 10-027926 A | 1/1998 |
| JP | A 11-68371 | 3/1999 |
| JP | 2001-230584 A | 8/2001 |
| JP | 2002-084029 A | 3/2002 |
| JP | A-2002-115981 | 4/2002 |
| JP | 2003-186107 A | 7/2003 |

* cited by examiner

*Primary Examiner*—Melissa Jan Koval
(74) *Attorney, Agent, or Firm*—Oliff & Berridge, PLC

(57) ABSTRACT

Exemplary embodiments of the invention provide a light source device to cool a solid-state light source at a high efficiency even in a case where a large quantity of heat has developed from the solid-state light source including a minute heat generation region. A light source device includes a solid-state light source, micro heat pipes which are provided on the light-emission rear surface side of the solid-state light source, and liquid cooling portions which are provided at parts of the micro heat pipes.

10 Claims, 6 Drawing Sheets

(a)

(b)

LIGHT SOURCE DEVICE, METHOD FOR MANUFACTURING LIGHT SOURCE DEVICE, AND PROJECTION TYPE DISPLAY APPARATUS

BACKGROUND OF THE INVENTION

1. Field of Invention

Exemplary embodiments of the present invention provide a light source device, a method to manufacture a light source device, and a projection type display apparatus. Exemplary embodiments further provide a light source device having a construction which is well suited to cool a light source.

2. Description of Related Art

The related art includes a projection type display apparatus such as projector, which presents a display in such a way that light emitted from a light source device is entered into an optical modulation device such as a liquid-crystal light valve, and that image light modulated by the optical modulation device is enlarged and projected on a screen by a projection lens or the like. A solid-state light source such as LED light source, is adopted as a light source for use in the light source device of the projection type display apparatus. Since such a solid-state light source generates heat simultaneously with light emission, it requires cooling in order to enhance its light emission efficiency. As a technique which cools a chip having such a solid-state light source or the like heat generation source, related art documents JP-A-6-97335 and JP-A-11-68371 disclose that the chip is cooled by holding a heat pipe or the like in touch with the chip.

SUMMARY OF THE INVENTION

In related art documents JP-A-6-97335 and JP-A-11-68371, the heat pipe is held in touch with the chip to-be-cooled, and heat is transferred to a heat radiation portion through the heat pipe. With such a method, however, satisfactory cooling is sometimes impossible in a case where a heat generation region is minute and where the quantity of heat generation is large.

Exemplary embodiments of the present invention have been made in view of the above discussed and/or other problems. Exemplary embodiments provide a light source device which is capable of cooling a solid-state light source at a high efficiency even in a case where a large quantity of heat has developed from the solid-state light source including a minute heat generation region. Exemplary embodiments of the present invention provide a method which is capable of easily manufacturing such a light source device. Further, exemplary embodiments of the present invention provide a projection type display apparatus of high reliability as includes such a light source device.

In order to address the above described and/or other problems, the light source device of exemplary embodiments of the present invention are characterized by including a solid-state light source; a working-liquid migration path which is provided on a light-emission rear surface side of the solid-state light source; and liquid cooling device provided at part of the working-liquid migration path.

According to such a light source device, the working-liquid migration path is provided on the light-emission rear surface side of the solid-state light source. A liquid cooling device to cool the path with a liquid is provided, so that the working-liquid migration path is positively cooled by the liquid cooling device, and a cooling efficiency is enhanced much more than in a construction wherein heat is merely radiated by a heat pipe (working-liquid migration path) as in the related art. More specifically, in exemplary embodiments of the present invention, heat is transferred through the working liquid which migrates in the working-liquid migration path, and the transferred heat is reduced by the liquid cooling device. Since a thermal resistance is conspicuously lower than in a case of directly cooling a heating surface, the heat is transferred along the working-liquid migration path from the rear surface of the solid-state light source being a heating portion, in a moment. As such, the working-liquid migration path is cooled with the liquid, whereby the cooling efficiency can be sharply enhanced. Accordingly, even in a case where heat has developed in a large quantity in the solid-state light source of the light source device, it is permitted to hold a satisfactory cooling efficiency. Moreover, since the working-liquid migration path is interposed between the liquid cooling device and the solid-state light source, the liquid cooling device can be disposed at a position remote from the solid-state light source. Accordingly, exemplary embodiments address or attain the simplification of the construction of the light source device and the facilitation of the manufacture thereof.

In the light source device of exemplary embodiments of the present invention, it is possible that each of a plurality of such working-liquid migration paths is constructed to be rectilinear, and that the working-liquid migration paths are juxtaposed on the rear surface side of the solid-state light source in an aspect where their lengthwise directions are held parallel to a rear surface of the solid-state light source. In this case, even in a case where the solid-state light source being a heat generation region is minute, it is permitted to sufficiently bring the working-liquid migration paths into touch with the heating surface, because the plurality of working-liquid migration paths being elongate are juxtaposed in parallel with the rear surface of the solid-state light source. Moreover, owing to the rectilinear construction of each working-liquid migration path, the migratability of the working liquid is enhanced. Accordingly, the heat transfer proceeds more efficiently, and the cooling efficiency based on the cooling device is enhanced more.

On the other hand, it is possible that each of a plurality of such working-liquid migration paths is constructed to be rectilinear, and that the working-liquid migration paths are juxtaposed on the rear surface side of the solid-state light source in an aspect where their lengthwise directions are held perpendicular to a rear surface of the solid-state light source. Also in this case, owing to the rectilinear construction of each working-liquid migration path, the migratability of the working liquid is enhanced. Accordingly, the heat transfer proceeds more efficiently, and the cooling efficiency based on the cooling device is enhanced more. Besides, owing to the installation aspect of the light source device, it is possible to arrange the working-liquid migration paths in the vertical direction from the solid-state light source. On this occasion, especially in case of installing the light source device in an aspect where the working liquid falls in the vertical direction, the migratability of the working liquid is enhanced more.

The liquid cooling device can be disposed at an end part of the working-liquid migration path of the rectilinear construction. Owing to the disposition of the liquid cooling device at the lengthwise end part in this manner, it is permitted to enhance the migratability of the working liquid and to separate the solid-state light source and the liquid cooling device, and it is permitted to attain the simplification of the device and the facilitation of the manufacture.

The solid-state light source can include a substrate, and a light emitting element which is disposed on the substrate, while the substrate is disposed on a predetermined base, and that the working-liquid migration path is disposed at a boundary part between the substrate and the base. In this case, the working-liquid migration path can be disposed in assembling the substrate and the base, so that a manufacturing efficiency is enhanced. Concretely, the light source device can be manufactured by a process which includes forming a recess on a rear surface side of the substrate formed with the light emitting element; forming a recess in the same shape as a recess shape on the substrate side, in a surface of a base on which the solid-state light source with the light emitting element disposed on the substrate is placeable; and sticking the substrate and the base to each other while the respective recesses are being located. Owing to such a method, it is permitted to easily provide the light source device of exemplary embodiments of the present invention.

In the light source device of exemplary embodiments of the present invention, it is possible that an inner surface of the working-liquid migration path is formed with a slot structure. In this case, capillarity occurs owing to the fine slot structure, and the liquefaction and vaporization of the working liquid are promoted, that is, the heat transfer is promoted. Incidentally, a working liquid may be sealed in the working-liquid migration path in a reduced pressure state.

Next, the projection type display apparatus of exemplary embodiments of the present invention includes the light source device stated above. Concretely, the display apparatus can include the light source device, an optical modulation device which modulates light emitted from the light source device, and a projection device which projects the light modulated by the optical modulation device. Since such a projection type display apparatus includes the light source device of superior cooling efficiency, it is difficult for consumption of the light source device attributed to heating, the lowering of the light emission efficiency of the light source device, or the like, and it becomes very high in reliability.

DETAILED DESCRIPTION OF PREFERRED EMBODIMENTS

Figure 1:
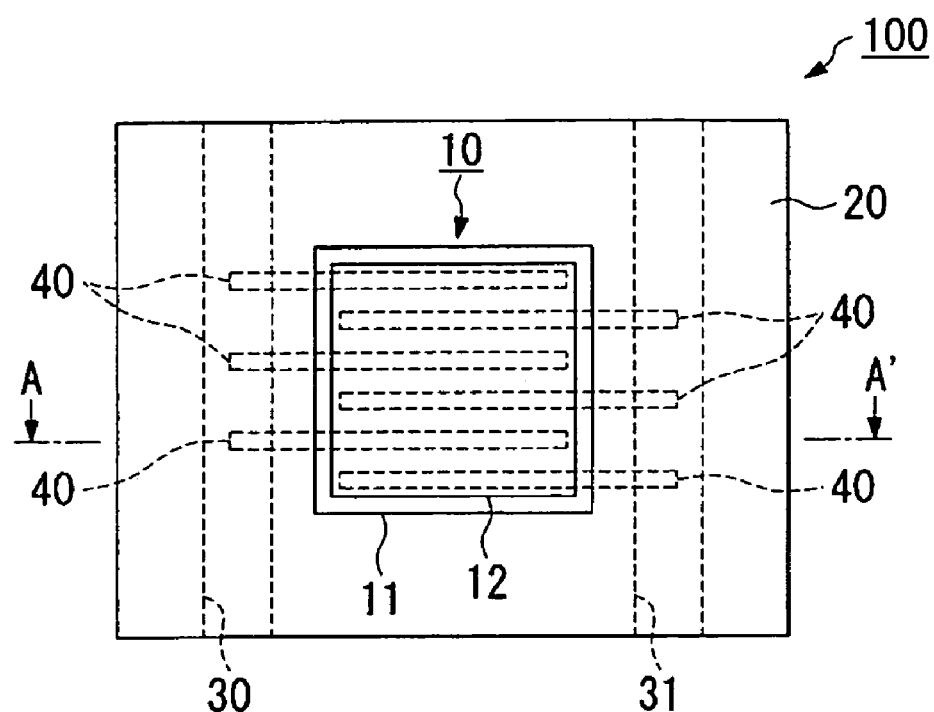
FIG. 1 is a schematic plan view showing an exemplary embodiment of the light source device of the present invention.

Exemplary embodiments of the present invention will be described with reference to the drawings. In each figure, individual layers or individual members are endowed with different reduced scales for the purpose of making them large enough to be recognized on the drawing.

Figure 2:
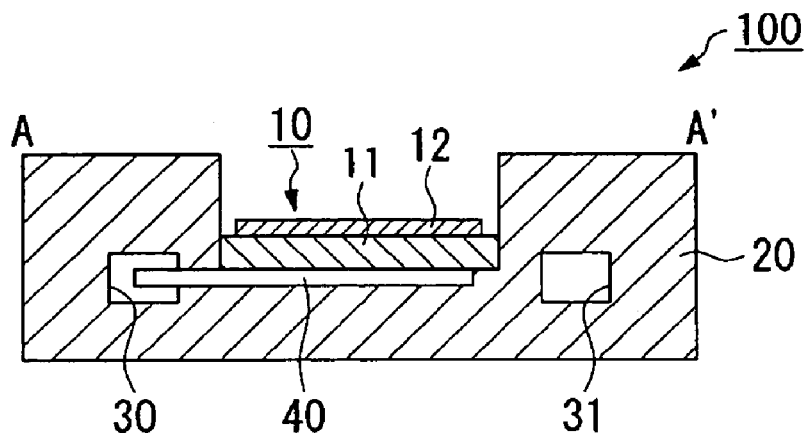
FIG. 2 is a schematic showing section A-A' in FIG. 1.

FIG. 1 is a schematic plan view showing a construction for a light source device according to one exemplary embodiment of the present invention. FIG. 2 is a schematic view showing section A-A' in FIG. 1.

The light source device 100 is chiefly constructed of a solid-state light source 10 which forms the essence of light emission, and a base 20 which fixes the solid-state light source 10. According to this exemplary embodiment, a solid-state light source whose light emission is attended with heat generation, such as an LED light source employing a light-emitting diode element, is adopted as the solid-state light source 10. The base 20 is provided with a light-source installation portion to locate and fix the solid-state light source 10. The solid-state light source 10 is located and fixed to the base 20 by such a technique in which the solid-state light source 10 is stuck to, fitted into or placed on the light-source installation portion.

The solid-state light source 10 is constructed including a substrate 11, and the light emitting element 12 which is disposed on the substrate 11, and the substrate 11 is disposed on the base 20. Besides, a plurality of micro heat pipes (working-liquid migration paths) 40, in which a liquid being a heat transfer medium (working liquid, for example, water) is sealed under reduced pressure, are disposed on the rear surface side of the substrate 11 (that is, light-emission rear surface side) in the solid-state light source 10.

Each micro heat pipe 40 is constructed to be rectilinear, and the plurality of micro heat pipes are arranged in parallel on the rear surface side of the solid-state light source 10 in an aspect where their lengthwise directions are held parallel to the rear surface of the solid-state light source 10. A liquid cooling portion (liquid cooling device) 30 or 31 is disposed at one end part of each micro heat pipe 40. The liquid cooling portion 30 or 31 is constructed in the shape of a pipe (cooling-liquid circulation pipe) which is provided penetrating through the base 20, and a cooling liquid (here, cold water) is circulated in the pipe. Incidentally, each micro heat pipe 40 is disposed at the boundary part between the base 20 and the substrate 11 of the solid-state light source 10, and it has a construction in such an aspect that recesses respectively formed in the base 20 and the substrate 11 are combined with each other.

According to the light source device 100 of such a construction, the adoption of the micro heat pipes 40 lowers a thermal resistance conspicuously as compared with a case where the rear surface of the substrate 11 of the solid-state light source 10 is directly cooled. Further, heat can be dissipated from the light emitting element (light emitting layer) 12 into the surroundings quickly. Besides, the dissipated heat is reduced with the water by the liquid cooling portions 30 and 31, whereby the simple construction is permitted to sharply heighten a cooling efficiency. Moreover, since the liquid cooling portions 30 and 31 being the liquid cooling device, can be disposed in parts remote from the solid-state light source 10, the manufacture of the light source device 100 can be facilitated.

Each micro heat pipe 40 is constructed to be rectilinear, and the plurality of micro heat pipes are arranged in parallel or substantially parallel on the rear surface side of the solid-state light source 10 in the aspect where their lengthwise directions are held substantially parallel to the rear surface of the substrate 11 of the solid-state light source 10. Accordingly, even in a case, for example, where the solid-state light source 10 is an extraordinarily minute heat generation region, the micro heat pipes 40 can be sufficiently brought into touch with a heating surface. Moreover, owing to the rectilinear construction of each micro heat pipe 40, the migratability of the working liquid is enhanced, with the result that heat transfer proceeds more efficiently, and the cooling efficiency based on the cooling device is enhanced more.

Figure 3:
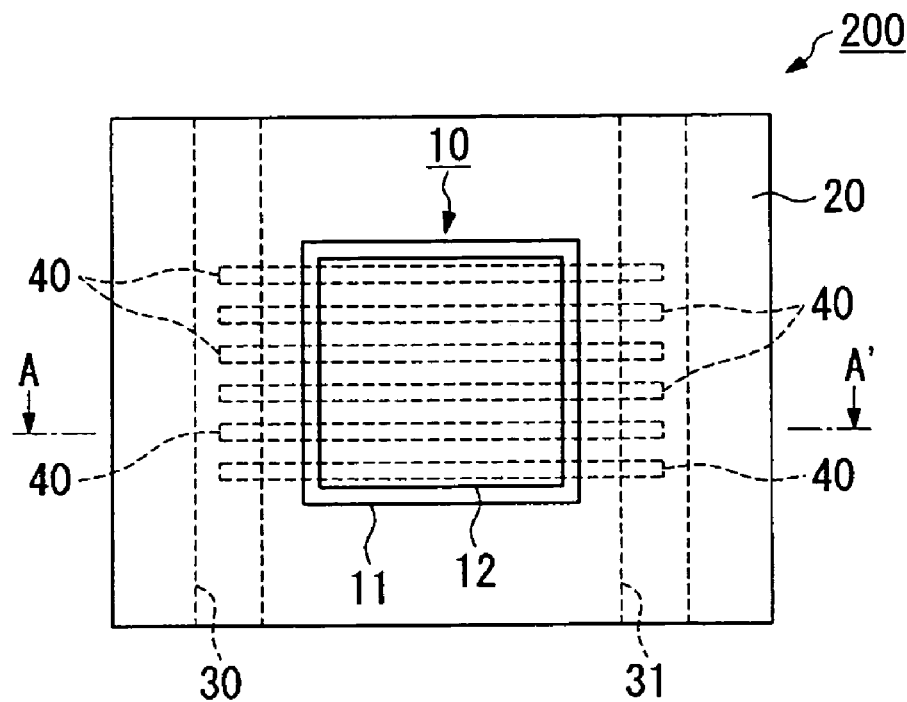
FIG. 3 is a schematic plan view showing an exemplary modification to the light source device in FIG. 1.
Figure 4:
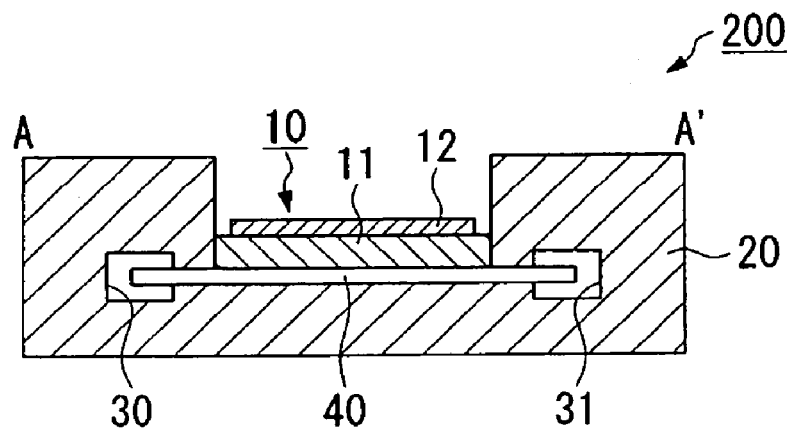
FIG. 4 is a schematic showing section A-A' in FIG. 3.

Now, exemplary modifications to the above exemplary embodiment will be described. FIGS. 3 and 4 are a schematic plan view and a schematic sectional view showing a light source device 200 in the first exemplary modification, and FIGS. 3 and 4 are drawings corresponding to FIGS. 1 and 2 of the light source device 100, respectively. In the light source device 200, liquid cooling portions 30 and 31 are provided at both the ends of each of rectilinear micro heat pipes 40 which are elongated. A working liquid is cooled by the liquid cooling portions in the two places. Thus, the enhancement of a cooling efficiency is attained. Incidentally, regarding the other constructions in the light source device 200, members and constituents to which the same reference numerals and signs as in the light source device 100 are assigned, have the same constructions.

Figure 5:
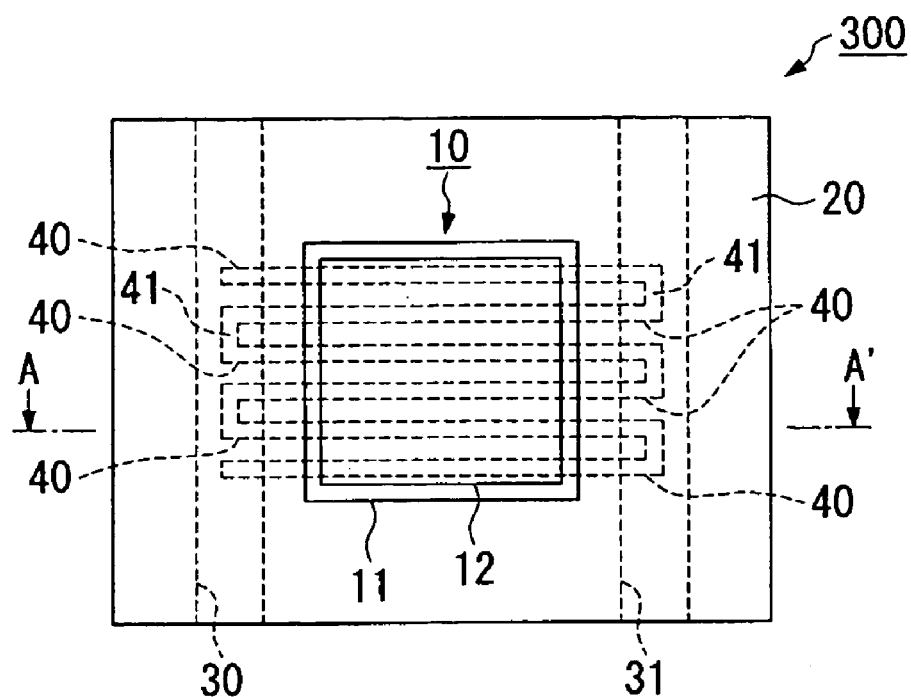
FIG. 5 is a schematic plan view showing an exemplary modification to the light source device in FIG. 1.
Figure 6:
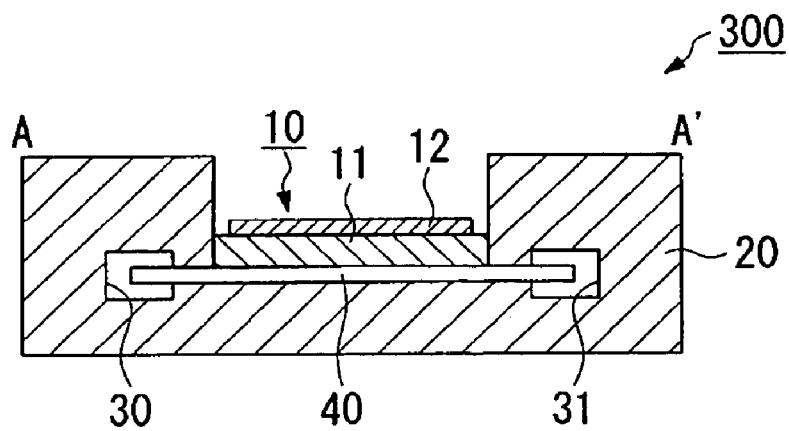
FIG. 6 is a schematic showing section A-A' in FIG. 5.

Next, FIGS. 5 and 6 are a schematic plan view and a schematic sectional view showing a light source device 300 in the second exemplary modification, and are drawings corresponding to FIGS. 1 and 2 of the light source device 100, respectively. In the light source device 300, liquid cooling portions 30 and 31 are provided at both the ends of each of rectilinear micro heat pipes 40 which are elongated. A working liquid is cooled by the liquid cooling portions in the two places, and the adjacent micro heat pipes 40 are joined by joint portions 41 in the liquid cooling portions 30 and 31, whereby the enhancement of a cooling efficiency is attained. Incidentally, regarding the other constructions in the light source device 300, members and constituents to which the same reference numerals and signs as in the light source device 100 are assigned, have the same constructions.

Figure 7:
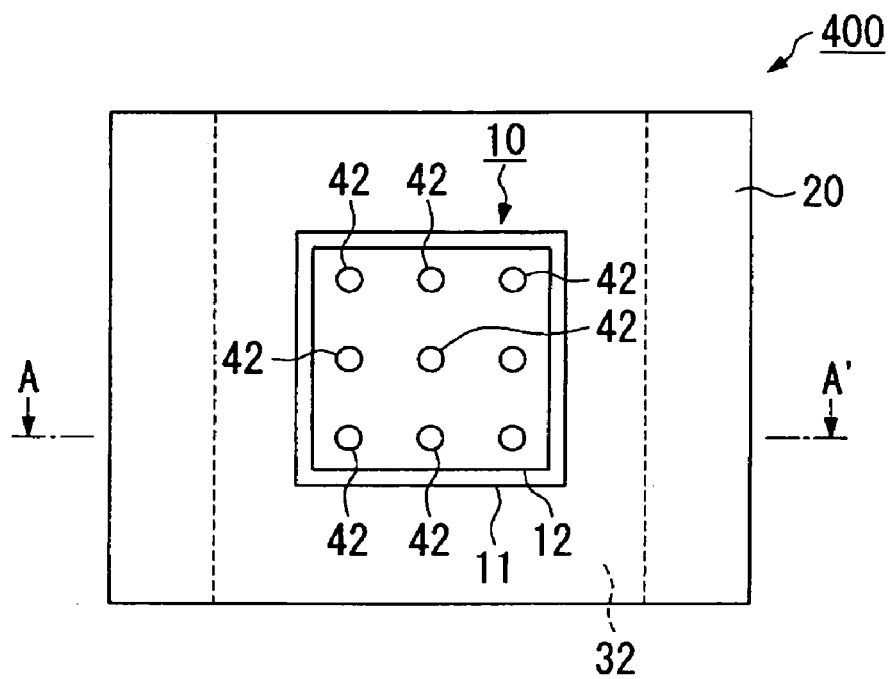
FIG. 7 is a schematic plan view showing an exemplary modification to the light source device in FIG. 1.
Figure 8:
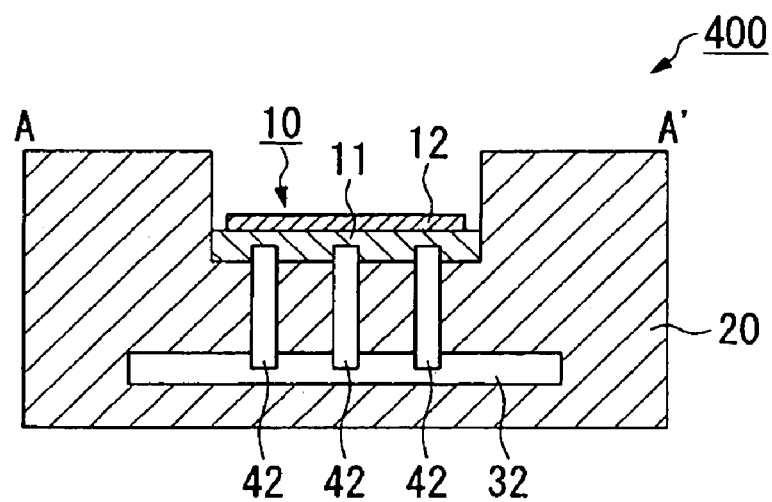
FIG. 8 is a schematic showing section A-A' in FIG. 7.

Next, FIGS. 7 and 8 are a schematic plan view and a schematic sectional view showing a light source device 400 in the third exemplary modification, and are drawings corresponding to FIGS. 1 and 2 of the light source device 100, respectively. In the light source device 400, a plurality of rectilinear micro heat pipes 42 which are elongated, are arranged in parallel in an aspect where their lengthwise axes are held perpendicular to the rear surface of the substrate 11 of a solid-state light source 10. That is, the heat pipes 42 extend in a direction perpendicular to the rear surface of the substrate 11 of the solid-state light source 10, and one end of each of the micro heat pipes 42 is cooled with a liquid by a liquid cooling portion 32. In this case, owing to the rectilinear construction of each micro heat pipe 42, the migratability of the working liquid is enhanced, so that heat transfer proceeds more efficiently to enhance a cooling efficiency. Moreover, in this case, the migratability of the working liquid can also be more enhanced by arranging the light source device 400 so that the working liquid may migrate in the gravitational direction. Incidentally, regarding the other constructions in the light source device 400, members and constituents to which the same reference numerals and signs as in the light source device 100 are assigned, have the same constructions.

Figure 9:
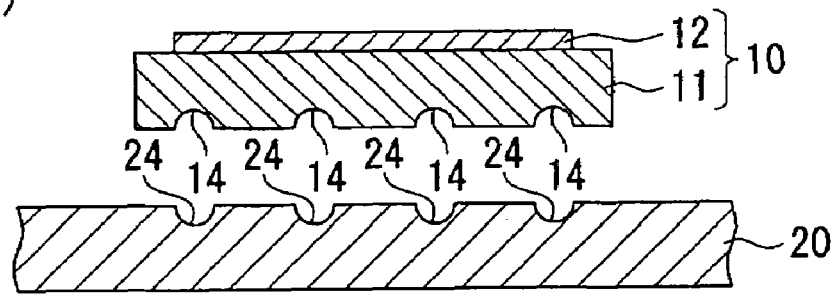
FIGS. 9(a)-(b) are schematic sectional views showing a step as to the method of exemplary embodiments of the present invention to manufacture a light source device, in model-like fashion.
Figure 9:
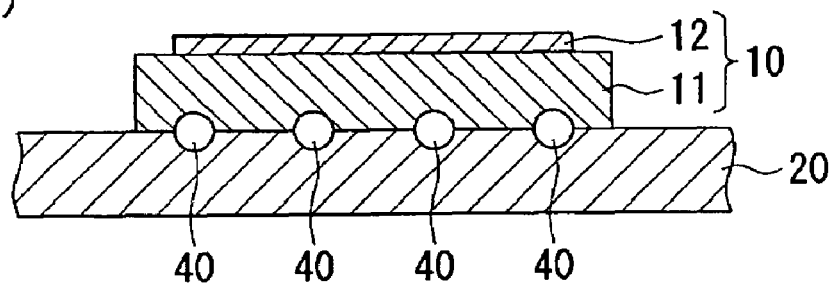

FIGS. 9(*a*)-(*b*) are schematics showing an exemplary embodiment as to the method of the present invention to manufacture a light source device. Here, the step of forming a micro heat pipe 40 shall be chiefly described. First, as shown in FIG. 9(*a*), a solid-state light source 10 which includes a light emitting element 12 on a substrate 11 is prepared, and the substrate 11 is formed with recesses 14. A base 20 is formed with recesses 24 symmetrically with the corresponding recesses 14 on the side of the solid-state light source 10. Incidentally, at least one end of each of the recesses 24 is provided with a liquid cooling portion 30 or 31 in the shape of a pipe beforehand.

The substrate 11 of the solid-state light source 10 and the base 20 are stuck together under reduced pressure in a state where the respectively corresponding recesses 14 and 24 are opposed symmetrically. In this case, the sticking power between the substrate 11 and the base 20 is enhanced by interposing a binder or the like on the interface between them.

Figure 10:
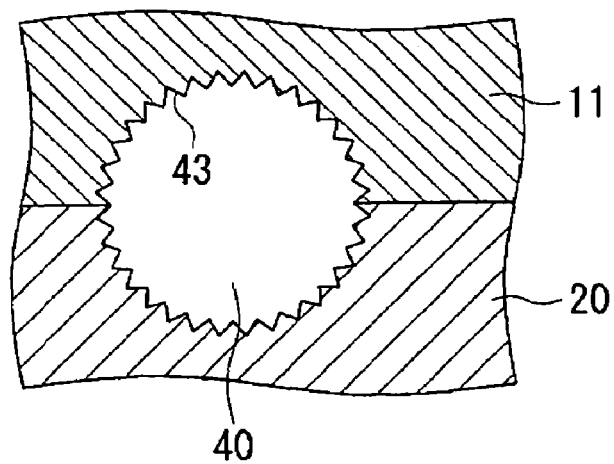
FIG. 10 is a schematic showing the sectional construction of a micro heat pipe.

In the case where the recesses are formed in the rear surface of the substrate 11 of the solid-state light source 10, it is recommended that only a thickness enough to ensure the strength of the substrate 11 is left behind, thereby to bring the recesses as near to the light emitting element 12 (light emitting layer) as possible, and that the largest possible number of recesses are formed. Besides, the surfaces of the recesses should preferably be formed with fine ruggedness (in the shape of troughs). In this case, as shown in FIG. 10 by way of example, a plurality of fine slots 43 are disposed on the inner surface of the obtained micro heat pipe 40. Owing to the formation of such fine slots 43, capillarity arises in the slots, and the liquefaction or vaporization of a liquid (working liquid) being a heat transfer medium is promoted, that is, heat transfer is promoted.

Figure 11:
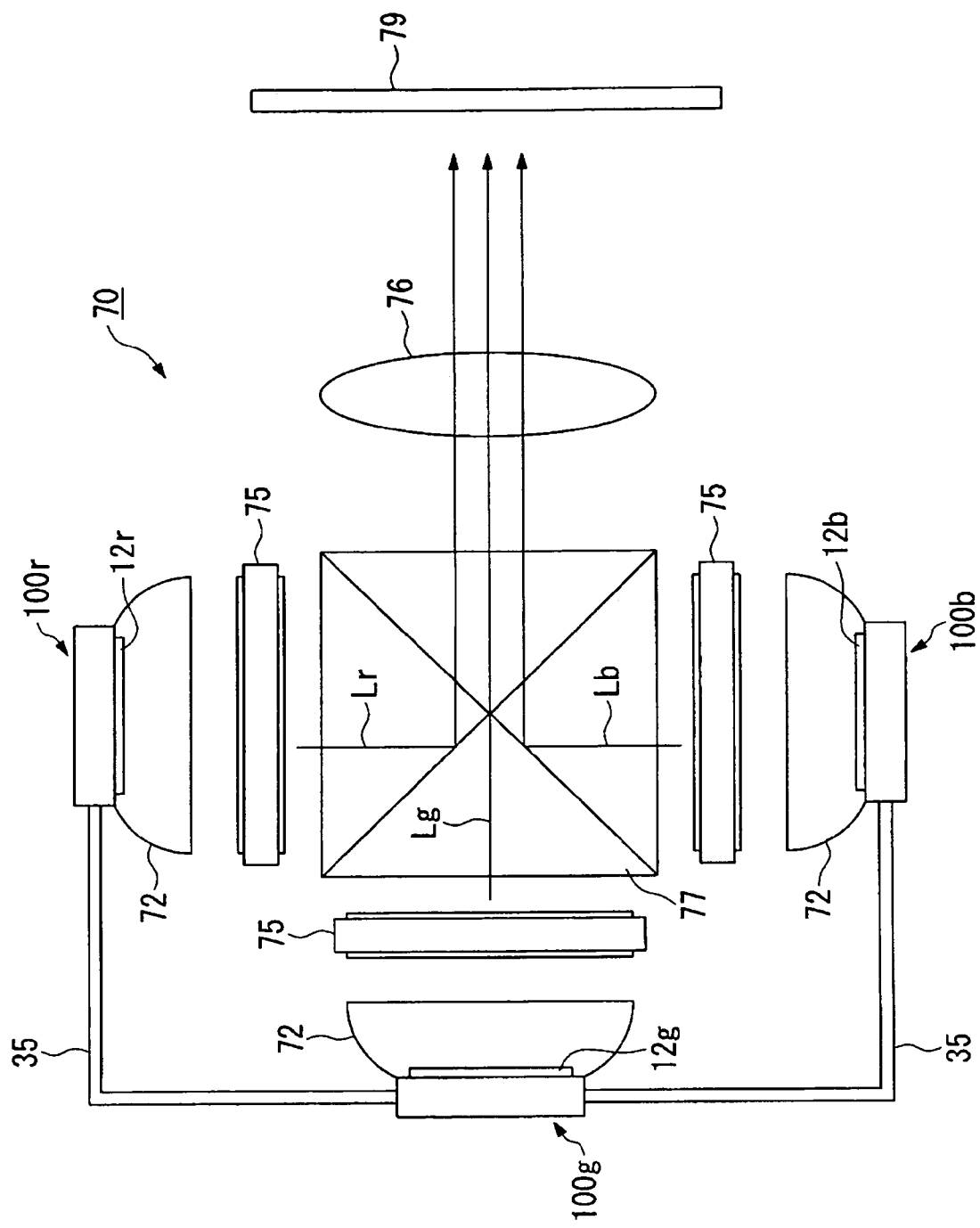
FIG. 11 is a schematic showing a construction as to an exemplary embodiment of the projection type display apparatus of the present invention.

FIG. 11 is a schematic showing a construction as to a projection type display apparatus which is an exemplary embodiment of the present invention, and the projection type display apparatus 70 shown in FIG. 11 is an example of three-plate scheme. In the projection type liquid-crystal display apparatus 70, the three light sources of an LED light source 100*r* which includes an LED 12*r* capable of emitting color light of red (R), an LED light source 100*g* which includes an LED 12*g* capable of emitting color light of green (G), and an LED light source 100*b* which includes an LED 12*b* capable of emitting color light of blue (B), are employed as separate light sources. Incidentally, any of the light source devices 100, 200, 300 and 400 in the various exemplary embodiments stated before is adoptable as each of the LED light sources 100*r*, 100*g* and 100*b*, and a light guide portion 72 which consists of a rod lens, etc. is arranged on the exit side of each LED light source.

Liquid-crystal light valves 75 which modulate the color lights of R, G and B, are respectively disposed on the exit sides of the light guide portions 72. Besides, the three color lights modulated by the respective liquid-crystal light valves 75 enter a cross dichroic prism (color synthesis device) 77. The prism 77 has four rectangular prisms stuck together, and a dielectric multilayer film which reflects the red light, and a dielectric multilayer film which reflects the blue light are formed crosswise inside the prism. The three color lights Lr, Lg and Lb are synthesized by the dielectric multilayer films, thereby to form light which represents a color image. The light subjected to the color synthesis is projected on a screen 79 by a projection lens 76, and an enlarged image is displayed.

In such a projection type display apparatus 70, any of the light source devices in the foregoing exemplary embodiments is adopted for each of the LED light sources 100*r*, 100*g* and 100*b*, so that the display apparatus becomes one of high light emission efficiency, excellent durability and high reliability. Incidentally, each of the LED light sources 100*r*, 100*g* and 100*b* is provided with liquid cooling portions (cooling-liquid circulation pipes) 30 and 31 (refer to FIG. 1) through which a cooling liquid circulates. In this regard, in order to circulate the cooling liquid through the liquid cooling portions 30 and 31 of all the LED light sources 100*r*, 100*g* and 100*b* in common, common pipes 35 are coupled to the LED light sources 100*r*, 100*g* and 100*b*. As a result, the circulations of the cooling liquid through the liquid cooling portions 30 and 31 are communized, and the construction of a cooling system is made very simple.

Although the exemplary embodiments of the present invention have been mentioned above, the invention shall not be restricted to them, but it shall cover a scope within which a person engaged in the art can easily substitute wordings defined in the appended claims, without being restricted to the wordings, as long as the scope defined in the claims is not departed from, and enhancements or improvements based on knowledge which the person engaged in the art has ordinarily, can be appropriately added to the invention. By way of example, in each of the exemplary embodiments, the construction of the present invention has been adopted for the cooling of the LED light source, but it is also possible to adopt the construction of the invention in cooling another solid-state light source. Besides, the exemplary embodiments in which the light source devices of the present invention are adopted for the projection type display apparatus of three-plate scheme has been mentioned, but it is naturally possible to adopt the construction of the light source device of the invention for a projection type display apparatus of single-plate scheme.

What is claimed is:

1. A light source device, comprising:
   a solid-state light source;
   a working liquid contained in a working-liquid migration path provided on a light-emission rear surface side of the solid-state light source; and
   a cooling liquid contained in a cooling-liquid migration path,
   wherein the cooling liquid migration path is adjacent to and separate from the working-liquid migration path, and the cooling liquid directly contacts the working-liquid migration path.

2. The light source device as defined in claim 1, further comprising:
   a plurality of the working-liquid migration paths, each of the plurality of the working-liquid migration paths being rectilinear, the working-liquid migration paths being juxtaposed on the rear surface side of the solid-state light source, and lengthwise directions of the working-liquid migration paths being held parallel to a rear surface of the solid-state light source.

3. The light source device as defined in claim 1, further comprising:
   a plurality of the working-liquid migration paths, each of the plurality of the working-liquid migration paths being rectilinear, the working-liquid migration paths being juxtaposed on the rear surface side of the solid-state light source, and lengthwise directions of the working-liquid migration paths being held perpendicular to a rear surface of the solid-state light source.

4. The light source device as defined in claim 2, the liquid cooling migration path being disposed at an end part of the working-liquid migration path of the rectilinear construction.

5. The light source device as defined in claim 1, the solid-state light source including a substrate, and a light emitting element being disposed on the substrate, while the substrate is disposed on a predetermined base, the working-liquid migration path being disposed at a boundary part between the substrate and the base.

6. The light source device as defined in claim 1, an inner surface of the working-liquid migration path being formed with a slot structure.

7. The light source device as defined in claim 1, a working liquid being sealed in the working-liquid migration path under reduced pressure.

8. A projection type display apparatus, comprising:
   the light source device as defined in claim 1.

9. A projection type display apparatus, comprising:
   the light source device as defined in claim 1;
   an optical modulation device to modulate light emitted from the light source device; and
   a projection device to project the light modulated by the optical modulation device.

10. A method for manufacturing a light source device which has a solid-state light source including a substrate, and a light emitting element disposed on the substrate, comprising:
    forming a recess on a rear surface side of the substrate formed with the light emitting element;
    forming a recess in a same shape as a recess shape on the substrate side, in a surface of a base, that has a preformed cooling-liquid migration path, on which the solid-state light source is placeable; and
    sticking the substrate and the base to each other while the respective recesses are located forming a working-liquid migration path,
    wherein the cooling-liquid migration path is separate from and adjacent to the working-liquid migration path, and the cooling liquid directly contacts the working-liquid migration path.

* * * * *